(12) United States Patent
Osterberg et al.

(10) Patent No.: US 6,772,978 B2
(45) Date of Patent: Aug. 10, 2004

(54) DYNAMIC UNBALANCE COMPENSATION SYSTEM AND METHOD

(75) Inventors: David A. Osterberg, Glendale, AZ (US); Christopher J. Heiberg, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 29 days.

(21) Appl. No.: 10/081,639

(22) Filed: Feb. 22, 2002

(65) Prior Publication Data

US 2003/0160132 A1 Aug. 28, 2003

(51) Int. Cl.$^7$ .............................. B64G 1/28; G01C 19/30
(52) U.S. Cl. ........................ 244/165; 74/5.22; 74/5.34
(58) Field of Search ............................... 244/164, 165; 74/5.22, 5.34, 5.47; 701/13

(56) References Cited

U.S. PATENT DOCUMENTS

| | | | |
|---|---|---|---|
| 3,818,767 A | * | 6/1974 | Donohue et al. ........... 244/165 |
| 4,375,878 A | * | 3/1983 | Harvey et al. |
| 4,458,554 A | * | 7/1984 | Hrastar |
| 4,728,062 A | * | 3/1988 | Hubert ....................... 244/170 |
| 5,681,012 A | * | 10/1997 | Rosmann et al. |
| 6,340,137 B1 | * | 1/2002 | Davis et al. ................. 244/165 |
| 6,499,699 B1 | * | 12/2002 | Salenc et al. ............... 244/165 |

FOREIGN PATENT DOCUMENTS

| | | | |
|---|---|---|---|
| EP | 0 372 397 A2 | * | 6/1990 |
| EP | 1 126 300 A1 | * | 8/2001 |
| JP | 59 184835 A | * | 10/1984 |

* cited by examiner

*Primary Examiner*—Robert P. Swiatek

(57) ABSTRACT

A dynamic unbalance compensation system that compensates for dynamic unbalance of a rotating assembly on a vehicle, such as a spacecraft, to compensate for the presence of a dynamic unbalance moment. The system includes a vehicle, such as a spacecraft, a rotational assembly mounted on the vehicle and rotatable about an axis of rotation relative to the vehicle, and one or more momentum devices mounted on the rotational assembly and generating a momentum vector component perpendicular to the axis of rotation. The one or more momentum devices generate a compensation torque during spinning of the rotational assembly so as to compensate for dynamic unbalance of the rotational assembly.

25 Claims, 4 Drawing Sheets

DYNAMIC UNBALANCE COMPENSATION SYSTEM AND METHOD

BACKGROUND OF THE INVENTION

The present invention generally relates to balance compensation of rotational devices, and more particularly relates to compensating for dynamic unbalance of a rotating assembly, especially on a vehicle, such as a spacecraft.

Spacecraft (e.g., satellites) are frequently equipped with one or more spinning assemblies which rotate about an axis of rotation and exhibit a large product of inertia about the axis of rotation. For example, telescopes and other instruments can be mounted on a spinning platform on a spacecraft and rotated relative to the spacecraft. Other examples of rotating assemblies include parabolic antennas and reflectors which are continually rotated on a spinning platform, usually at constant speed relative to the spacecraft. Some rotating assemblies exhibit a static unbalance and/or a dynamic unbalance. A static unbalance is generally an unbalance in a radial direction to the axis of rotation that is characterized as a force that remains fixed in orientation with respect to the body of the rotating assembly. A dynamic unbalance is generally characterized as a moment that is a result of the rotating assembly about an axis other than a principle axis. An asymmetric assembly rotated about an axis, or a symmetric device rotated about an axis other than its principle axis, will generally tend to exhibit a dynamic unbalance moment.

The presence of a dynamic unbalance moment adversely affects stabilization of a spacecraft in orbit by tending to cause the spacecraft to move, e.g., jitter, in response to the rotating moment. Thus, the presence of a dynamic unbalance moment will tend to cause spacecraft pointing error which requires additional stability control to maintain the spacecraft in a desired orientation in orbit. One approach to mitigating dynamic unbalance includes adding balance mass to the rotating assembly in a manner that provides an equal but opposite moment to cancel out the dynamic unbalance moment. However, the addition of balance mass has several drawbacks including added size and weight to the spacecraft. Additionally, allowable envelope constraints may restrict where the balancing mass can be added. Further, if the envelope constraints are severe, the length of the moment arm of the balance mass may have to be reduced, thus resulting in an increase in the balance weights. As a consequence, the balance weights may have to be larger than the mass creating the initial unbalance.

Accordingly, it is therefore desirable to provide for a system which compensates for dynamic unbalance of a rotating assembly on a vehicle, such as a spacecraft, which does not exhibit drawbacks of the known prior approaches. In particular, it is desirable to provide for such a dynamic balanced system which does not add a significant amount of weight to the rotating assembly and meets strict envelope constraints.

SUMMARY OF THE INVENTION

The present invention provides a dynamic unbalance compensation system and method that compensates for dynamic unbalance of a rotational assembly. The system advantageously compensates for the dynamic unbalance of the rotational assembly without adding a significant amount of mass to the rotational assembly. The system includes a support member, such as a vehicle, a rotational assembly mounted on the support member and rotatable about an axis of rotation relative to the support member, and a momentum device mounted on the rotational assembly and generating a momentum vector component perpendicular to the axis of rotation. The momentum vector component produces a compensation torque when the rotational assembly rotates such that the compensation torque compensates for dynamic unbalance of the rotational assembly. According to one aspect of the present invention, the system is particularly well-suited for use on a vehicle, such as a spacecraft.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
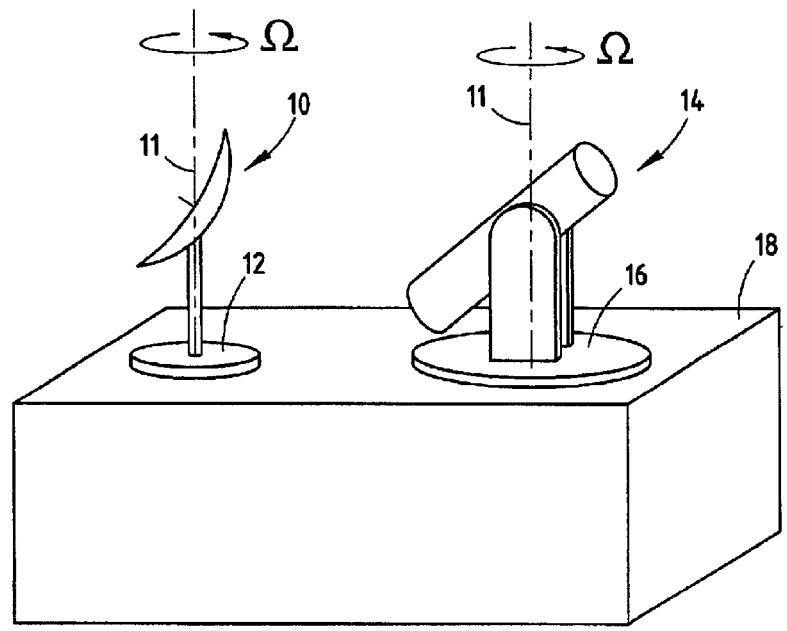
FIG. 1 is a perspective view of a spacecraft equipped with two rotational instrument assemblies mounted thereon.
Figure 2:
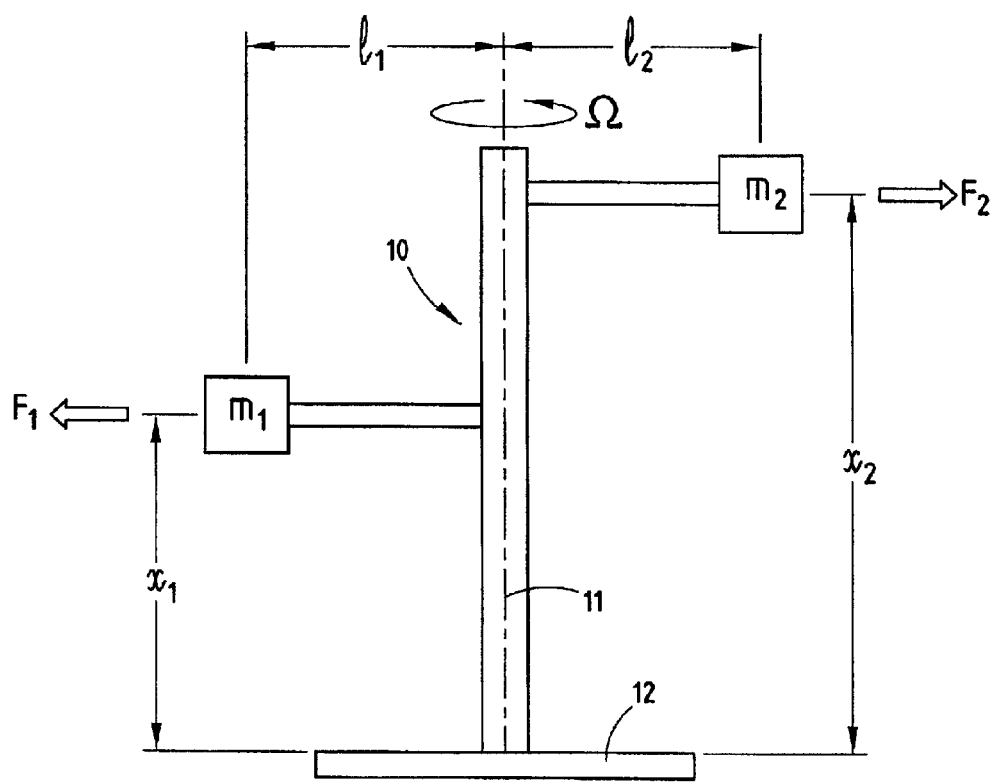
FIG. 2 is a schematic representation of one of the rotational assemblies exhibiting dynamic unbalance when the assembly spins about an axis of rotation.

Referring to FIG. 1, a satellite spacecraft vehicle, as generally indicated by block 18, is shown having spinning (rotational) instrument assemblies, including a spinning parabolic antenna assembly 10 and a spinning telescope assembly 14. Satellite spacecrafts are commonly equipped with one or more spinning rotational assemblies which spin about an axis of rotation to scan a region of coverage. The parabolic antenna assembly 10 is supported on a spinning platform 12 which rotates the parabolic antenna assembly 10 about an axis of rotation 11, relative to the spacecraft 18. Likewise, telescope assembly 14 is supported on a spinning platform 16 which spins the telescope assembly 14 about an axis of rotation 11, relative to the spacecraft 18. The spinning platforms 12 and 16 may be motor driven, according to one embodiment, to realize a spin rate $\Omega$. Spinning assemblies such as the parabolic antenna assembly 10 and telescope assembly 14 typically have a large mass and are rotated at an angular speed (i.e., spin rate $\Omega$) of twenty to forty revolutions per minute (RPM), for example. Many spacecraft mounted spinning assemblies typically are asymmetric about the spin axis of rotation and, thus, exhibit a dynamic unbalance. The present invention employs one or more momentum devices mounted on the rotatable assembly to generate a compensation torque to compensate for the dynamic unbalance.

A representation of one of the rotational assemblies, such as the parabolic antenna assembly 10, is illustrated in FIG.

2 having equivalent mass representations for the asymmetric configuration. The rotational assembly 10 is shown having an equivalent mass $m_1$ at a vertical momentum height $x_1$ and a length $l_1$ offset from the axis of rotation 11. In addition, the rotational assembly 10 has an equivalent mass $m_2$ at a momentum height $x_2$, which is greater than $x_1$, and a length $l_2$ offset from the axis of rotation 11. It should be appreciated that when the rotational assembly 10 is rotated about the axis of rotation 11 at a spin rate $\Omega$, the equivalent mass $m_1$ generates force $F_1$ at momentum height $x_1$, and mass $m_2$ generates force $F_2$ at momentum height $x_2$. Due to the dynamic unbalance of the rotating assembly 10, a dynamic unbalance moment is generated (using the right hand rule). If left uncompensated for, the dynamic unbalance moment is transferred to the satellite spacecraft 18, and thus may cause spacecraft pointing error.

Figure 3:
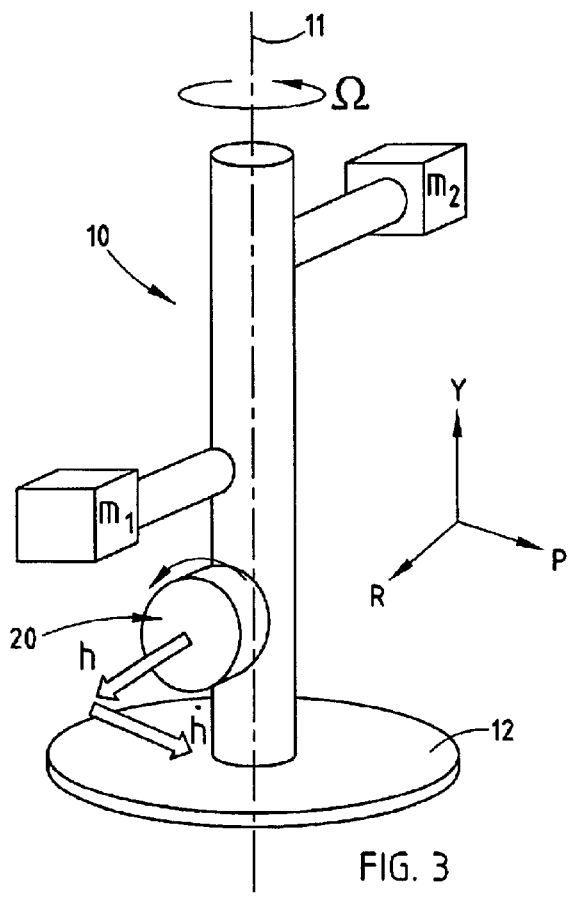
FIG. 3 is a schematic representation of a rotational assembly having a momentum device compensating for dynamic unbalance according to one embodiment of the present invention.

The present invention employs one or more momentum devices for generating a compensation torque that is equal and opposite to the dynamic unbalance moment so as to compensate for the dynamic unbalance, without requiring the addition of a significant amount of weight to the rotational assembly. Referring to FIG. 3, the rotational assembly 10 is shown having a momentum device 20, shown as a spinning momentum wheel, mounted to the rotational assembly 10 according to a first embodiment of the present invention. The momentum wheel 20 is mounted to the rotational assembly 10 so that the momentum wheel 20 generates angular momentum h perpendicular to the dynamic unbalance caused by the asymmetric rotating assembly 10 represented by masses $m_1$ and $m_2$. It should be appreciated that the spinning of rotational assembly 10 at spin rate $\Omega$ causes a dynamic unbalance moment in the negative P direction as shown by the rectilinear coordinates. The momentum wheel 20 generates angular momentum h which, at spin rate $\Omega$, produces a compensation torque $\dot{h}$ that compensates for the dynamic unbalance moment so as to reduce or eliminate the overall dynamic unbalance induced moment of the rotating assembly 10 applied to the spacecraft 18 at the base of the spin platform 12. The amount of angular momentum h generated by the momentum wheel 20 in the vector perpendicular to the dynamic unbalance depends on the size of the spinning momentum wheel 20, the speed of rotation of the momentum wheel 20, and the orientation of the momentum wheel 20 relative to the axis of rotation 11. The resultant amount of compensation torque $\dot{h}$ is a function of the product of the momentum vector h and the spin rate $\Omega$.

The momentum device 20 may include a conventional momentum wheel having a motor driven rotary mass configured to provide a rotating momentum vector sized so as to reduce or cancel the dynamic unbalance induced moment. The momentum device 20 may be fixed to the rotational assembly 10 and may further be mounted to the assembly 10 via a gimbal (not shown) which allows for adjustment of the orientation of the momentum device 20. It should be appreciated that adaptive dynamic balance compensation may be provided by adjusting speed and/or orientation of the momentum wheel 20 so as to vary the amount of angular momentum h in the vector perpendicular to the axis of rotation 11. This would enable active control of the momentum vector to bring the net dynamic unbalance to zero in the presence of a changing dynamic unbalance, such as may occur during a change in payload of the rotational assembly 10.

Figure 4:
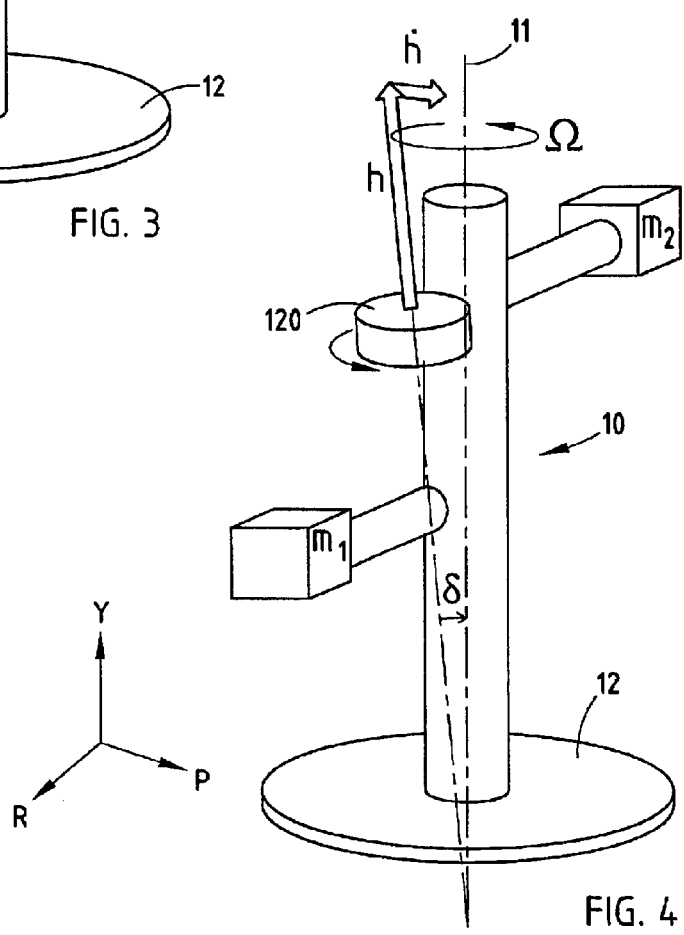
FIG. 4 is a schematic representation of a rotational assembly having a momentum device according to a second embodiment of the present invention.

In FIG. 4, the rotational assembly 10 is shown having a momentum device, such as a momentum wheel 120, oriented according to a second embodiment of the present invention. The momentum wheel 120 is mounted to the rotational assembly 10 along an axis offset by an angle $\delta$ offset from the angle of rotation 11 so as to control Y-axis momentum and also provide dynamic unbalance compensation. The momentum vector h is sized such that the Y-axis component of momentum is equal to h cos $\delta$, while the torque vector $\dot{h}$ is equal to h sin $\delta$, such that the resulting compensation torque $\dot{h}$ is equal and opposite to the dynamic unbalance caused by the asymmetric arrangement of rotating masses $m_1$ and $m_2$. The momentum wheel 120 provides the required angular momentum in the Y direction to spin the rotational assembly 10, while a component of the angular momentum h provides the dynamic unbalance compensation. By properly selecting the angle $\delta$ and the angular momentum vector h, compensation of angular momentum and dynamic unbalance can both be achieved.

The momentum wheel 120 may be fixedly mounted to the rotational assembly 10 or mounted via a gimbal assembly (not shown) which would allow adjustment of the orientation angle $\delta$ of the momentum wheel 120. Accordingly, the speed of rotation of the momentum wheel 120, orientation (angle $\delta$) of the momentum wheel 120, and size of the momentum wheel 120, will determine both the amount the angular momentum about the Y-axis and the dynamic unbalance compensation. One example of a momentum device includes a reaction wheel assembly (RWA). Other momentum wheels may be employed to achieve the desired angular momentum and dynamic unbalance compensation.

Figure 5:
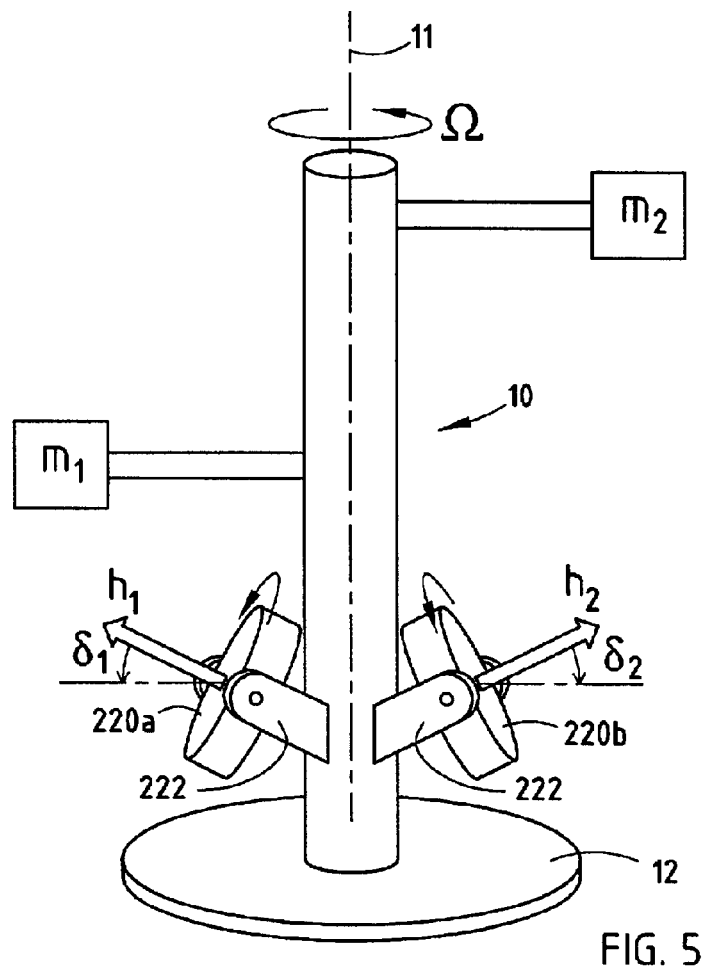
FIG. 5 is a schematic representation of a rotational assembly having a scissored pair of momentum devices according to a third embodiment of the present invention.

Referring to FIG. 5, the rotational assembly 10 is shown having a pair of momentum devices 220a and 220b according to a third embodiment of the present invention. The pair of momentum devices 220a and 220b, may include momentum wheels, oriented to form a scissored pair so as to allow for significant control torque about the axis of rotation 11 while providing augmented dynamic unbalance control. The momentum wheels 220a and 220b are shown mounted on opposite sides of the rotating assembly 12, and thus are angularly rotated one hundred eighty degrees (180°) relative to the other. The momentum wheels 220a and 220b may otherwise be arranged on the assembly 12. The first momentum wheel 220a is shown oriented at an angle $\delta_1$ relative to an axis perpendicular to the axis of rotation 11. The second momentum wheel 220b is oriented at angle $\delta_2$ relative to the axis perpendicular to the axis of rotation 11. Each of the momentum wheels 220a and 220b are shown mounted to the rotational assembly 10 via gimbals 222 which allow for adjustment of the orientation (angles $\delta_1$ and $\delta_2$) of each of the corresponding momentum wheels. The gimbals 222 each include a pair of gimbal mounts fixedly attached to the rotational assembly 10 and a shaft mounted in bearings between the gimbal mounts and rotatable to angularly rotate the momentum wheel. The momentum wheels may include a gimbaled reaction wheel driven by a motor or clutch (not shown) for positioning the orientation of the momentum wheels. The net dynamic unbalance moment created by the scissored pair of momentum wheels 220a and 220b provides a compensation torque that is equal and opposite to the dynamic unbalance. It should be appreciated that additional momentum wheels may provide the ability to achieve enhanced torque control.

Figure 6:
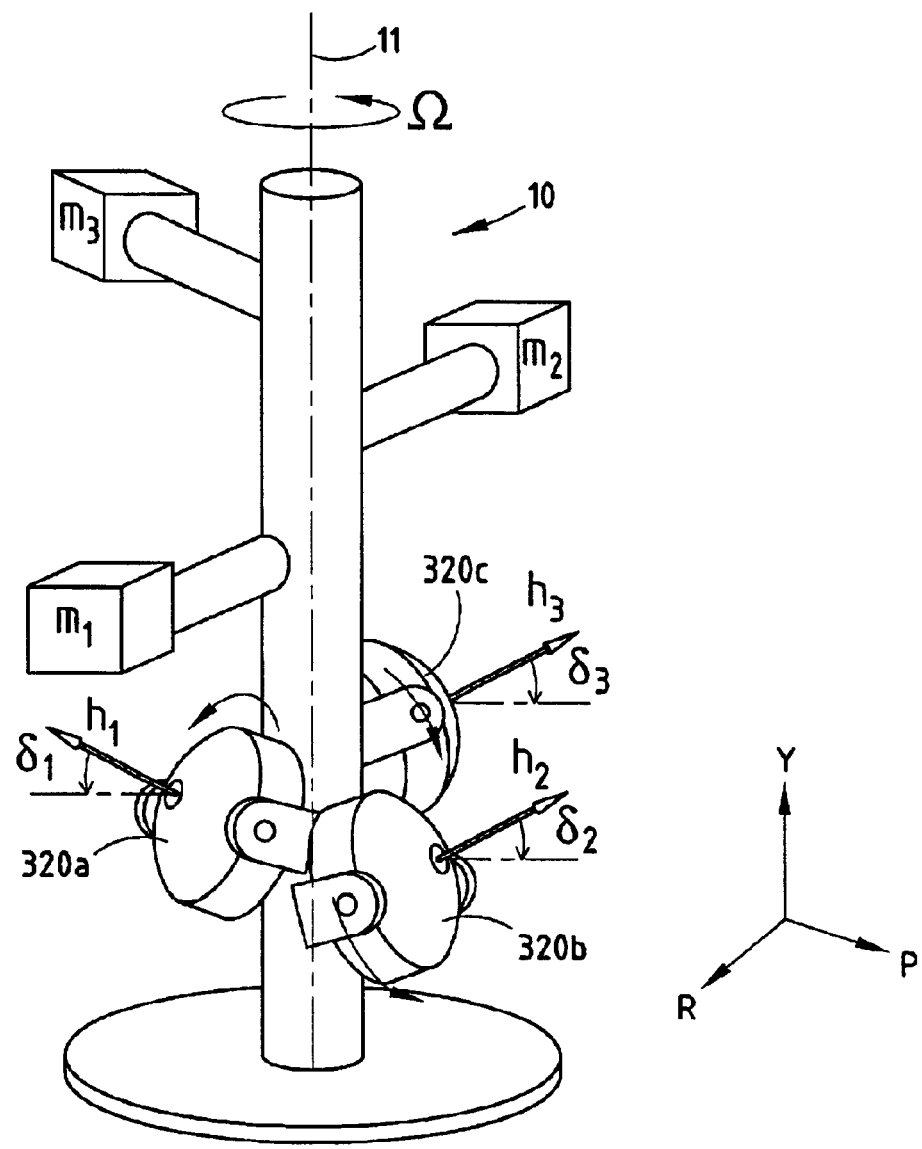
FIG. 6 is a schematic representation of a rotational assembly having three momentum devices according to a fourth embodiment of the present invention.

Referring to FIG. 6, the rotational assembly 10 is further shown represented with three masses $m_1$, $m_2$, and $m_3$ and has three momentum wheel devices 320a–320c equiangularly mounted thereto every one hundred twenty degrees (120°) around the rotational assembly 10. The three momentum wheels 220a–220c may otherwise be arranged on the assembly 12. The first momentum wheel 320a is oriented at an angle i, relative to an axis perpendicular to the axis of rotation 11 and generates angular momentum $h_1$. The second momentum wheel 220b is oriented at an angle $\delta_2$ relative to the axis perpendicular to the axis perpendicular to the axis of rotation 11 and generates a second angular momentum $h_2$. The third momentum wheel 220c is oriented at an angle $\delta_3$ relative to the axis perpendicular to the axis of rotation 11 and generates an angular momentum $h_3$. Each of the momentum wheels 320A–320C is mounted on a gimbal 322 which allows for adjustment of the orientation (angles $\delta_1$, $\delta_2$, and $\delta_3$) of each of the momentum wheels. By employing three or more momentum devices, three axes torque and momentum control can be achieved such that any unwanted cross torque is reduced or eliminated from the rotational assembly 10 and dynamic unbalance compensation can be achieved at various rotational rates. The three momentum devices 320a–320c may form a gimbaled momentum system, such as a control moment gyroscope (CMG) array which allows three axis momentum control as well as dynamic unbalance compensation without emitting unwanted torque to the whole structure. Momentum control for such a system can be controlled through rotor speed of the individual momentum wheels and/or by changing the gimbal orientation of the corresponding momentum wheels 320a–320c.

Figure 7:
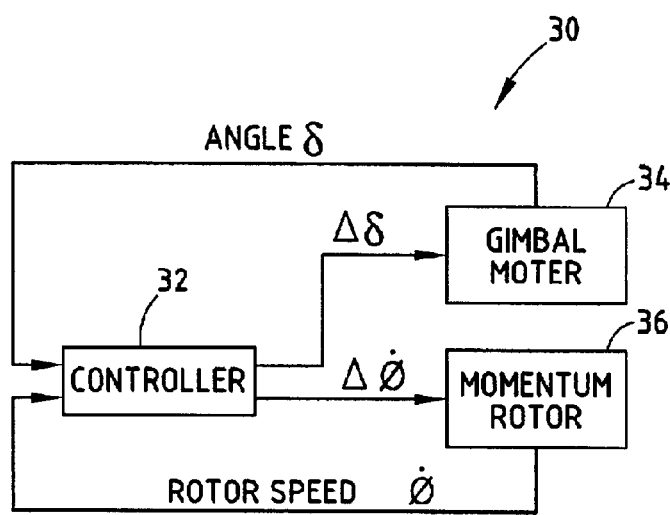
FIG. 7 is a block diagram illustrating a feedback control system for controlling one or more momentum devices.

It should be appreciated that each of the above-described embodiments of employing one or more momentum devices to compensate for dynamic unbalance of a rotational assembly 10 may further employ an active control system, such as the feedback control system shown in FIG. 7, to provide for active control having a variable range of dynamic unbalance compensation. The control system may include a controller 32, a gimbal motor 34, and a momentum rotor 36, and may further include sensors, such as a rotor speed sensor and gimbal angle sensor (not shown). The controller 32 monitors the angle $\delta$ of the gimbal motor as well as the rotor speed $\phi$ of the momentum device(s) and provides an angular control signal $\Delta\delta$ to control the angle $\delta$ of the gimbal motor 34, as well as a speed control signal $\Delta\phi$ to control the speed $\phi$ of the momentum rotor 36. It should be appreciated that by controlling the rotor speed $\dot{\phi}$ and orientation $\delta$ of the gimbal, the momentum device(s) may be adjusted to achieve enhanced dynamic unbalance compensation. The controller 32 may further control spin-up and spin-down of the payload of the rotational assembly 10, while simultaneously adjusting the momentum compensation to adjust for changes in the dynamic unbalance.

Accordingly, the rotational assembly 10 advantageously provides for dynamic balance compensation without adding significant weight to the rotational assembly 10. By reducing or eliminating the dynamic unbalance, the rotational assembly 10 is less susceptible to pointing errors which may otherwise result on a satellite spacecraft. While the rotational assembly 10 is shown employing one, two, or three momentum devices, it should be appreciated that any number and various types of momentum devices may be employed without departing from the teachings of the present invention. It should be appreciated that the dynamic unbalance compensation system of the present invention may also be useful for the field of robotics and precision instrument controls, in addition to use on spacecraft.

The above description is considered of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A system having dynamic unbalance compensation, said system comprising:
    a support member;
    a rotational assembly mounted on the support member and rotatable about an axis of rotation relative to the support member; and
    one or more momentum devices mounted on the rotational assembly, each momentum device generating a momentum vector component perpendicular to the axis of rotation, wherein each momentum vector component generates a compensation torque when the rotational assembly spins so as to compensate for dynamic unbalance of the rotational assembly,
    wherein each momentum device is oriented to generate a first component of the momentum vector perpendicular to the axis of rotation and a second component of the momentum vector parallel to the axis of rotation.

2. The system as defined in claim 1, wherein each momentum device comprises a rotating momentum wheel.

3. A system as defined in claim 1, wherein each momentum device is oriented to provide an angular momentum vector substantially perpendicular to the axis of rotation.

4. The system as defined in claim 1, wherein the one or more momentum devices includes a first momentum device and a second momentum device.

5. The system as defined in claim 4, wherein the first and second momentum devices form a scissored pair.

6. The system as defined in claim 1, wherein the one or more momentum devices includes first, second, and third momentum devices.

7. The system as defined in claim 6, wherein the first, second, and third momentum devices are mounted on the rotational assembly equiangularly located about the axis of rotation.

8. The system as defined in claim 1, wherein the support member comprises a vehicle.

9. The system as defined in claim 8, wherein the vehicle comprises a spacecraft.

10. The system as defined in claim 1, wherein the rotational assembly comprises an instrument.

11. The system as defined in claim 1 further comprising a controller for controlling at least one of speed and orientation of each momentum device so as to control the momentum vector.

12. A spacecraft system having dynamic unbalance compensation, said system comprising:
    a spacecraft;
    a rotational assembly mounted on the spacecraft and rotatable about an axis of rotation relative to the spacecraft; and
    one or more momentum devices mounted on the rotational assembly, and each momentum device generating a momentum vector component perpendicular to the axis of rotation, wherein the momentum vector component generates a compensation torque when the rotational assembly spins so as to compensate for dynamic unbalance of the rotational assembly,
    wherein each momentum device is oriented to generate a first component of the momentum vector perpendicular to the axis of rotation and a second component of the momentum vector parallel to the axis of rotation.

13. The system as defined in claim 12, wherein each momentum device comprises a rotating momentum wheel.

14. A system as defined in claim 12, wherein each momentum device is oriented to provide an angular momentum vector substantially perpendicular to the axis of rotation.

15. The system as defined in claim 12, wherein the one or more momentum devices includes a first momentum device and a second momentum device.

16. The system as defined in claim 15, wherein the first and second momentum devices form a scissored pair.

17. The system as defined in claim 12, wherein the one or more momentum devices includes first, second, and third momentum devices.

18. The system as defined in claim 17, wherein the first, second, and third momentum devices are mounted on the rotational assembly equiangularly located about the axis of rotation.

19. The system as defined in claim 12, wherein the rotational assembly comprises an instrument.

20. The system as defined in claim 12 further comprising a controller for controlling at least one of speed and orientation of each momentum device so as to control the momentum vector.

21. In a system having a rotational assembly mounted on a vehicle, and one or more momentum devices rotationally mounted on the rotational assembly, a method of balancing a dynamic unbalanced rotating assembly on the vehicle, said method comprising the steps of:

rotating the rotational assembly about an axis of rotation relative to the vehicle; and rotating each momentum device to thereby apply momentum in a vector perpendicular to the axis of rotation to generate (i) a compensation torque during rotation of the rotational assembly so as to compensate for dynamic unbalance of the rotational assembly, (ii) a first component of the momentum vector perpendicular to the axis of rotation, and (iii) a second component of the momentum vector parallel to the axis of rotation.

22. The method as defined in claim 21, wherein each momentum device comprises a momentum wheel.

23. The method as defined in claim 21, wherein the step of rotating each momentum device further includes rotating a first momentum device and a second momentum device.

24. The method as defined in claim 23, wherein the step of rotating each momentum device further includes rotating a third momentum device.

25. The method as defined in claim 21 further comprising the step of controlling at least one of speed and orientation of each momentum device so as to control the momentum vector.

* * * * *